(12) United States Patent
Follestad et al.

(10) Patent No.: US 6,780,809 B1
(45) Date of Patent: Aug. 24, 2004

(54) CATALYST FOR THE (CO) POLYMERIZATION OF ETHYLENE AND A METHOD FOR THE PREPARATION THEREOF

(75) Inventors: Arild Follestad, Stathelle (NO); Vidar Almquist, Porsgrunn (NO); Ulf Palmqvist, Stenungsund (SE); Harri Hokkanen, Ketokiventie (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/601,652
(22) PCT Filed: Feb. 9, 1999
(86) PCT No.: PCT/NO99/00043
§ 371 (c)(1), (2), (4) Date: May 21, 2003
(87) PCT Pub. No.: WO99/40126
PCT Pub. Date: Aug. 12, 1999

(30) Foreign Application Priority Data

Feb. 9, 1998 (NO) .......................................... 19980552

(51) Int. Cl.[7] .......................... B01J 31/00; B01J 37/00; C08F 4/02; C08F 4/60
(52) U.S. Cl. .......................... 502/113; 502/43; 556/27; 556/28; 526/62; 526/72
(58) Field of Search ................... 502/113, 43; 556/27, 556/28; 526/62.72

(56) References Cited

U.S. PATENT DOCUMENTS

| 6,469,111 B1 | * | 10/2002 | Mihan et al. | 526/74 |
| 6,541,581 B1 | * | 4/2003 | Follestad et al. | 526/105 |
| 6,545,105 B1 | * | 4/2003 | Follestad et al. | 526/65 |
| 6,573,343 B1 | * | 6/2003 | Follestad | 526/65 |
| 6,610,799 B1 | * | 8/2003 | Follestad et al. | 526/113 |
| 6,627,706 B1 | * | 9/2003 | Follestad et al. | 526/64 |

FOREIGN PATENT DOCUMENTS

| EP | 0 733 650 A1 | 9/1996 |
| EP | 0 339 571 A1 | 2/1999 |
| WO | WO 96/14154 A1 | 5/1996 |
| WO | WO 97/08213 A1 | 3/1997 |

* cited by examiner

*Primary Examiner*—Mark L. Bell
*Assistant Examiner*—Jennine M. Brown
(74) *Attorney, Agent, or Firm*—Nixon & Vanderhye P.C.

(57) ABSTRACT

A particulate, modified chromium oxide catalyst for the polymerisation of ethylene or ethylene with α-olefins, comprising: a) a chromium-oxide catalyst, b) a transition metal compound, and c) a catalyst activator. A method for the preparation of the catalyst comprises the steps of: a) subjecting a chromium oxide catalyst precursor, which comprises a chromium oxide compound combined with an inorganic support, to a temperature in the range of from 400 to 950° C. under oxidising conditions, and b) impregnating the obtained chromium catalyst with a catalyst activator and with a transition metal compound which comprises at least one cyclopentadienylic ring bonded to said transition metal and at least ligand selected from the group comprising alkoxy, amido and hydrocarbyl radicals, halogen and hybride bonded to said transition metal, which cyclopentadienylic ring may contain hetero atoms, be unsubstituted or substituted, be bonded to said transition metal through a bridge, and optionally annealed to other substituted or unsubstituted ring structures, and if two cyclopentadienyl rings are present they may be bonded to each other through a bridge, and c) subjecting the thus obtained particulate catalyst to drying conditions. This catalyst is suitable for producing polyethylenes under conditions of continuous feeding of all reactants.

9 Claims, 1 Drawing Sheet

CATALYST FOR THE (CO) POLYMERIZATION OF ETHYLENE AND A METHOD FOR THE PREPARATION THEREOF

FIELD OF INVENTION

The present invention relates to a dual site catalyst comprising a chromium oxide catalyst with a transition metal compound and a catalyst activator, and a method for the preparation of this catalyst. The catalyst is particularly suitable for producing polyethylenes, homopolymers and copolymers, having a bimodal or broad molecular weight distribution.

PRIOR ART

Linear polyethylenes, such as high density polyethylene (HDPE) and linear low density polyethylene (LLDPE), can be endowed with specific properties through a suitable choice of polymerization conditions and polymerisation catalysts, of which chromium oxide and metallocene catalysts are among the commercially most important. Chromium oxide catalysts are characterized in that their active sites have different ratios between propagation and chain transfer. Moreover, they tend to produce short polymer chains and incorporate comonomer units at a high frequency. As a result, the obtained polymer will have possible comonomers and side chains unevenly distributed between the macromolecules. Consequently, the produced polymers will have a broad molecular weight distribution, and these polymers will have good processability properties. The metallocene catalysts, often called single site catalysts (SSC) because all their active sites are equal, produces polymers having a narrow molecular weight distribution and an even distribution of possible comonomers and side chains along the polymer backbone. These polymers have desired properties like high impact strength, good transparency, and high hot tack. The main disadvantage is their poor processability due to to the narrow molecular weight distribution. A combination of the properties of chromium oxide and metallocene polymers would be highly desireable for many end uses, in particular will polyethylenes having a controlled broad or bimodal molecular weight distribution be advantageous in polymer processing by extrusion. Such polyethylenes have traditionally been produced by consecutive polymerisations at different conditions in two reactors in a series. Another approach has been to perform the polymerisations in the presence of a modified catalyst, including the use of combinations of different catalysts. However, when combining different catalysts, such as chromium and metallocene containing catalysts, they have a tendency to inactivate each other.

U.S. Pat. No. 3,378,536 discloses a process for the polymerisation of ethylene by the use of a two-component catalyst system consisting of (a) chromium deposited on e.g. silica, where the chromium is activated in an oxygen-containing gas at a high temperature, and then reduced with CO; and (b) chromium or vanadium arene where the arene is an aromatic, optionally substituted, $C_6$ ring. The two catalyst components are preferably fed separately to the polymerisation reactor.

EP 088 562 discloses a modified polymerisation catalyst comprising a silica support with deposited chromium. Following oxidation in dry air, the chromium is modified by being contacted with a transition metal compound containing a π-bonded ligand. The transition metal is Ti, V or Cr, preferably Ti. Preferably, the ligand is an unsaturated carbocyclic or heterocyclic ring system containing 6 delocalized π-electrons, for example cyclopentadienyl. The disclosed catalyst is not particulate. Only the use of bis-toluene titanium is exemplified, and the obtained polyethylenes have a substantial degree of branching and a medium to broad molecular weight distribution.

U.S. Pat Nos. 5,330,950 and 5,408,015 relate to ethylene polymers having broad molecular weight distributions, obtained by the use of a catalytic mixture including a MgO-supported Ziegler catalyst and a chromium oxide catalyst.

U.S. Pat. No. 5,399,622 discloses a process for the polymerisation of ethylene. The polymerisation is started with a chromium oxide catalyst to obtain granules of low density polyethylene. The polymerisation is continued by adding a cocatalyst and an yttrium-containing catalyst of formula $(Cp_2YX_x)_yM_zL_n$, wherein Cp is an optionally substituted cyclopentadienyl, X is a halide, M is an alkali metal and L is an electron donor ligand, to obtain an outer shell of high density polyethylene on said granules. The disclosed catalyst is not particulate.

EP 339571 discloses a process for producing polyethylenes having a broad molecular weight distribution by the use of a catalyst system consisting of: a catalyst component (A) comprising a silica support onto which there is deposited a titanium or chromium compound; a catalyst component (B) comprising a transition metal compound with a ligand having conjugated π-electrons e.g. $Cp_2ZrCl_2$; and a catalyst component (C) which is an aluminoxan, e.g. MAO. The MAO and the metallocene are not impregnated into the catalyst support and therefore the catalyst will hardly be a true dual site catalyst. It would be expected that the chromium oxide catalyst makes one type of particle and the metallocene another type of particle, optionally partly attached to each other, but anyhow making a very inhomogeneous powder. The two types of catalyst sites or precursor sites are not directly exposed to each other. There is no mention of any prereduction of $Cr^{6+}$ to $Cr^{2+}$. The polymerisations will result in polymers having an undesireable amount of low molecular weight polymers.

EP-A-0 287 666 discloses a process for the polymerisation of olefins in the presence of a catalyst composed of (A) a metallocene compound, e.g. $CP_2ZrCl_2$, optionally supported on silica, (B) an aluminoxane, and (C) an organoaluminium compound, e.g. triisobutyl aluminium. The obtained polymers have a narrow molecular weight distribution.

WO 96/14154 discloses a dual site catalyst comprising a calcined silica support impregnated with dibutylmagnesium, 1-butanol and $TiCl_4$, and also impregnated with MAO and $(BuCp)_2ZrCl_2$. This catalyst, which contains both a non-metallocene and a metallocene transition metal component, is used in the polymerisation of ethylene in one single reactor to obtain polyethylenes having a bimodal molecular weight distribution.

The object of the present invention is to provide a dual site catalyst that may be used in a single polymerisation reactor to obtain ethylene polymers having a controlled bimodal or broad molecular weight distribution. It has now surprisingly been found a versatile dual site catalyst that combines the features of both prior art chromium oxide and metallocene catalysts. A remarkable advantage is that this catalyst produces chromium and SSC polyethylenes simultaneously in one and the same polymer particle. The polymer particles as polymerised will when processed give a homogeneous polymer melt. With this novel dual site catalyst polyethylene resins for a broad application area can be produced. The resins have particularly good extrusion properties and are especially well suited for processing by film blowing and blow moulding.

SUMMARY OF THE INVENTION

The present invention thus provides a particulate, modified chromium oxide catalyst for the polymerisation of ethylene or ethylene with α-olefins, comprising:

a) a chromium-oxide catalyst comprising a chromium oxide combined with an inorganic support, b) a transition metal compound comprising at least one cyclopentadienylic ring bonded to said transition metal, which cyclopentadienylic ring may contain hetero atoms, be unsubstituted or substituted, bonded to the transition metal through a bridge, optionally annealed to other ring structures, and if two cyclopentadienyl rings are present they may be bonded to each other through a bridge, and c) a catalyst activator.

A method for the preparation of a catalyst for the polymerisation of ethylene, or ethylene with α-olefins, comprises the steps of:

a) subjecting a chromium oxide catalyst precursor, comprising a chromium oxide combined with an inorganic support, to oxidising conditions to obtain the chromium in an oxidised state, and b) impregnating the obtained chromium catalyst with a catalyst activator and with a transition metal compound comprising at least one cyclopentadienylic ring bonded to the transition metal and at least one ligand selected from the group comprising alkoxy, amido and hydrocarbyl radicals, a halogen and a hydride, bonded to the transition metal, which cyclopentadienylic ring may contain hetero atoms, be unsubstituted or substituted, be bonded to the transition metal through a bridge, and optionally annealed to other ring structures, and if two cyclopentadienyl rings are present they may be bonded to each other through a bridge, and c) subjecting the thus obtained particulate catalyst to drying conditions.

In a preferred embodiment of the present invention the oxidised catalyst obtained in step a) above further is subjected to reducing conditions to obtain a major part of the chromium in a divalent oxidation state before being subjected to the impregnation step b).

The catalyst defined above is used in the homopolymerisation of ethylene or copolymerisation of ethylene with α-olefins.

DETAILED DESCRIPTION OF THE INVENTION

Figure 1:
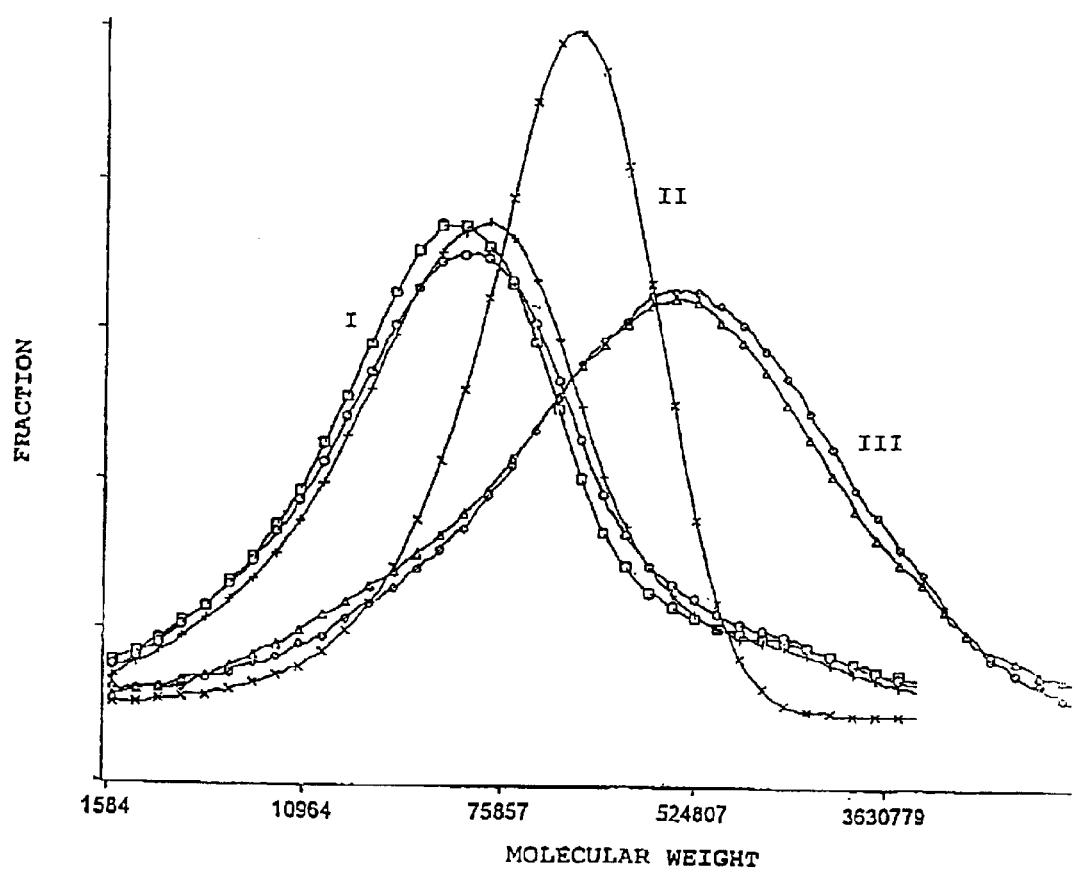
FIG. 1 is a drawing showing molecular weight distribution graphs for polyethylenes produced with the catalyst of the invention (I), and common metallocene catalysts (II) and chromium oxide catalysts (III).

A catalyst precursor of the present invention comprises a support to which there is joined a chromium oxide and a metallocene. Suitable catalyst supports are particulate inorganic, oxygen-containing compounds, preferably selected from the group comprising silica, alumina and silica/alumina, more preferably silica-based supports containing more than 85% by weight of silica.

To prepare the catalyst precursor an appropriate amount of a chromium compound is joined to the surface of the support. Minor amounts of titanium and/or aluminium compounds may also be incorporated, either together with the chromium compound, or separately. The chromium compound used may be any appropriate chromium salt, or an inorganic or organic chromium compound that can be-oxidised to a chromium oxide. The amount of chromium compound mixed with the inorganic support must be sufficient to finally obtain between 0.001% and 10%, preferably from 0.1% to 2.0%, by weight of chromium, calculated as metallic chromium, based on the weight of the inorganic support. The chromium compound may be joined to the surface of the support in various ways. A preferred method is coprecipitation of the chromium compound with the inorganic oxygen-containing compound and then forming the precipitate into catalyst particles which consequently will include the two components.

Convenient methods are well known in the art and are disclosed in a number of publications, also in the patents cited herein-before. When the impregnation is finished any possible remaining solvent is removed to obtain a dry solid.

Such solid chromium oxide/support catalyst precursors are commercially available from a number of producers. A closer description of their preparation is therefore regarded as being superfluous. Useful catalyst precursors have average particle sizes preferably in the range from about 10 $\mu$m to greater than 150 $\mu$m, more preferred from 20 $\mu$m to 120 $\mu$m, and a particle size distribution from narrow to broad. The particles may be of a spherical shape obtained by the spray drying of a suspension, or having an irregular geometry obtained by comminuting a solid substance. The final catalyst component particles should have a surface area from 150 to 600 m$^2$/g, more preferred from 400 to 550 m$^2$/g, and a pore volume from 1 to 3 cm$^3$/g.

The obtained catalyst precursor has to be activated before use. This is done by calcination in dry air or another oxygen-containing gas at temperatures in the range from 400 to 950° C., preferably from 550 to 900° C., during a period from 10 minutes to 72 hours, preferably from 2 to 20 hours. The oxidised catalyst precursor may be subjected to reduction, preferably with carbon monoxide or a mixture of carbon monoxide and an inert component, such as nitrogen or argon. The reduction is normally performed at a temperature within the range from 300 to 500° C. during a period from 5 minutes to 48 hours, preferably from 1 to 10 hours. When the reduction treatment is finished, the major part of the contained chromium should preferably be in a divalent oxidation state. Such a reduction step is not obligatory. Unreduced chromium oxide will eventually be reduced by the olefin monomers during polymerisation. The only drawback is that there will be observed an induction period before the chromium oxide catalyst sites start to produce polyethylenes. When the chromium oxide/support catalyst component is in a reduced state, either as a dry powder or as a suspension in a dry oxygen-free hydrocarbon solvent, e.g. an alkane, it must be stored under inert conditions.

The present invention is not restricted to any particular procedure for the preparation of the chromium oxide/support catalyst. However, certain polymer properties will vary depending on the particular conditions applied during the preparation of the chromium catalyst.

The obtained chromium oxide/support catalyst is then impregnated with a transition metal compound comprising at least one cyclopentadienylic ring bonded to the transition metal. This cyclopentadienylic ring may contain hetero atoms, be unsubstituted or substituted. The cyclopentadienylic ring may be bonded directly to the transition metal or through a bridge. Also, it may optionally be annealed to other ring structures which themselves may be substituted. If two cyclopentadienyl rings are present they may be bonded to each other through a bridge. Such a transition metal compound is often generally termed "metallocene". Among the many different metallocenes that may be useful in the present invention, particularly preferred compounds are such in which the transition metal is selected from titanium, zirconium and hafnium. Also bonded to the transition metal will be at least one ligand, preferably selected from the group comprising alkoxy, amido and hydrocarbyl radicals, halogen and hydride. During the preparation of the final catalyst of the present invention it is believed that this ligand, partly or completely, will leave the catalyst upon the action of the catalyst activator and/or monomers.

Suitable metallocene compounds of the composition above are known in the art and have been recited in earlier patent publications (see for example WO 96/14154 mentioned above). Preferred metallocene compounds are bis-(alkylcyclopentadienyl)-transition metal halides, preferably bis-(n-butylcyclopentadienyl)-zirconium dichloride or bis-(n-butylcyclopentadienyl)-hafnium dichloride. Metallocene catalysts are often designated "single site catalyst", abbreviated SSC. A procedure for the preparation of supported metallocene catalysts is disclosed in Applicant's earlier Norwegian patent application no. NO 960898, the description of which is included herein by reference. The obtained catalyst particles of the present invention will produce polymer particles having a good morphology.

The catalyst must also comprise an activator component, such as an aluminoxan or an ionic activator, preferably an aluminoxan, and most preferably methylaluminoxane (MAO). The aluminoxan may be deposited onto the activated chromium oxide/support catalyst before, simultaneously with or after the deposition of the metallocene compound. Most conveniently both aluminoxan and metallocene are dissolved in a solvent, e.g. toluene, and the combined toluene solution is used to impregnate the chromium oxide/support catalyst. Eventually the solvent is removed by evaporation, preferably in an inert atmosphere, whereupon the catalyst is ready for use. The final catalyst will contain both chromium, zirconium or hafnium, and aluminium. In an embodiment of the present catalyst, it contains from 0.2% to 5%, preferably from 0.4% to 1%, by weight of chromium; from 0.05% to 0.6%, preferably about 0.2%, by weight of zirconium; and from 5% to 20%, preferably about 5%, by weight of aluminium; calculated as metal based on the total weight of the catalyst.

The catalyst of the present invention shows a high activity in polymerisations. This is surprising because the different catalytic sites are in intimate contact with each other and this is believed to result in a mutual inactivation. Moreover, at least the chromium oxide sites would be expected to be inactivated by a covering layer of MAO. However, experiments reveal that this catalyst will produce, simultanously, both chromium oxide and metallocene polyethylenes.

The present catalyst can be used to polymerise ethylene alone, or ethylene with up to 20% by weight of a comonomer or a mixture of different comonomers. As comonomers may be used all polymerizable α-olefins of the general formula $CH_2=CHR$, wherein R is a hydrocarbon radical containing 1–18 carbon atoms, preferably 1–10 carbon atoms. Examples of particularly preferred α-olefins are propylene, 1-butene, 1-hexene, 4-methyl-1-pentene and 1-octene. Also styrene and norbornene may be used as comonomers.

Polymerisations can be performed in any conventional type of reactor, such as in a batch reactor or most preferably in a continuous reactor. The present catalysts are suited for use in all types of olefin polymerisations, in particular gas phase and suspension polymerisations.

As used herein, the term "polyethylene" refers to both ethylene homopolymers and ethylene copolymers. The polyethylenes obtained by the process of the present invention will have a broad or bimodal molecular weight distribution (MWD), i.e. there will be a more or less distinct tail at the low and/or high molecular weight parts of the MWD graph. In FIG. 1, graph I represents a typical molecular weight distribution for polyethylenes obtained by the use of the catalysts of the invention. The unique feature of the present catalysts is that they contain active chromium sites and active metallocene sites on the same catalyst particle. The chromium sites on the catalyst will behave like any $Cr/SiO_2$ catalyst and produce polyethylenes having a high average molecular weight and a broad MWD. A typical MWD curve representing chromium-catalysed polyethylene is shown in FIG. 1 (graph III). Analogously, the metallocene sites on the catalyst will act independently of the Cr sites and produce polyethylenes having a lower average molecular weight and a narrow MWD (represented by graph II in FIG. 1). The present catalysts combine both these behaviours in one and the same catalyst particle. Thus, each polymer particle contains both chromium and metallocene based polymers, and the final polymer resin will have a superior morphology compared with polymer resins produced from one site catalysts in solution. The final polymer will therefore produce a homogeneous melt when processed.

The polyethylenes produced with the catalysts of the invention may have a number average molecular weight of the same magnitude as the metallocene-based polyethylenes, and a MWD of the same magnitude as the chromium-based polyethylenes. Prior to polymerisation, the catalyst may optionally be prepolymerized with a minor amount of ethylene in accordance with methods well known in the art, before being fed continuously to the polymerisation reactor. In general, polymerisations are performed at temperatures below about 110° C., and at a total pressure in the range of up to 70 bar. Hydrogen is used to control the molecular weight and melt index of the polymer, while comonomers are used to control the branching on the polyethylene backbone and hence the density of the polyethylene. The polymerisation parameters mentioned above are well known in the art and further details concerning polymerisations should be superfluous. Typical polymerisation conditions are presented in the examples below.

The produced polyethylenes will have a density from 910 to >960 kg/m³, and a melt index (MFR 2) from 0.01 to above 100 g/10 min, preferably from 0.1 to 60 g/10 min (determined according to the method of ASTM 1238), depending on the polymerisation conditions, as explained above. More detailed specifications concerning the properties of the obtained polyethylenes are given in the examples.

The present invention shall now be explained in more details by the following examples.

EXAMPLES

Preparation of Catalysts
$Cr/SiO_2$ Catalyst Precursor

In the following examples three different commercially available $Cr/SiO_2$ catalyst precursors were used, denominated A, B and C. For comparison a support comprising silica only, denominated D, is also included. Relevant physical and chemical properties are listed in Table 1. Such catalyst precursors are obtainable from various companies, for instance from companies Grace, Crosfield and PQ, and they represent the broadness of those $Cr/SiO_2$ catalyst precursors actually used today.

The calcination/activation of the catalyst precursors were carried out under fluidized bed conditions at the temperatures indicated in Table 1. Procedures well known in the art were followed. A 10 g sample of each catalyst precursor was activated/calcined in dry air for 5 hours to oxidise Cr to hexavalent Cr ($CrO_3$) and reduce the concentration of surface hydroxyl. Optionally, this oxidation step was followed by reduction for 3 hours with carbon monoxide (CO) in nitrogen ($N_2$) to reduce the oxidation state of the chromium.

TABLE 1

$Cr/SiO_2$ catalyst precursors

|  | A | B | C | D |
|---|---|---|---|---|
| Chromium (wt %) | 0,5 | 1,0 | 1,0 | 0 |
| Aluminium (wt %) | 0,8 | 0 | <0,3 | 0 |
| Titanium (wt %) | 0 | 2,6 | 2,5 | 0 |
| Pore volume (ml/g) | 2,5 | 1,0 | 2,5 |  |
| Surface area (m²/g) | 400 | 490 | 450 |  |
| Activation temp. in air/CO (° C.) | 580/380 680/380 | 580/— | 815/— 815/380 620/380 | 600/— |

Impregnation with a Metallocene Compound and MAO

All calcined components listed in Table 1 were transferred to a glove box and in a dry, oxygen-free nitrogen atmosphere impregnated with bis(n-butylcyclopentadienyl) zirconium dichloride and with methyl aluminoxane, according to the following procedure:

1) bis(n-butylcyclopentadienyl)zirconium dichloride is weighed into a Thomas flask equipped with a magnet bar stirrer;
2) 30% by weight of methyl aluminoxane (MAO) in toluene is added to the transition metal salt;
3) an additional amount of toluene is added and the content of the flask stirred for 30 minutes;
4) each catalyst component indicated in Table 1 is weighed into another Thomas flask equipped with a lid and a magnet stirrer; and
5) the catalyst component is stirred while the solution from step (3) is added dropwise by means of a syringe during a period from 5 to 10 minutes, thus obtaining a free flowing, not saturated powder, free from any lumps,
6) the stirring of the impregnated powder is continued for another 30 minutes, and subsequently
7) the lid on the flask is punctured with two cannula and a nitrogen purge established through the space inside the flask for about 30 minutes, and
8) the dried catalyst is stored under nitrogen until use.

Experimental parameters are given in Table 2.

TABLE 2

| | Catalysts | | | |
|---|---|---|---|---|
| Catalyst | Chromium catalyst (g) | Zr compound (g) | MAO (ml) | Toluene (ml) |
| A | 3,00 | 0,033 | 3,57 | 3,63 |
| B | 2,00 | 0,022 | 2,38 | 0 |

TABLE 2-continued

| | Catalysts | | | |
|---|---|---|---|---|
| Catalyst | Chromium catalyst (g) | Zr compound (g) | MAO (ml) | Toluene (ml) |
| C | 3,00 | 0,033 | 3,57 | 3,93 |
| D | 3,40 | 0,037 | 3,90 | 1,20 |

General Polymerisation Procedures

A laboratory stainless steel batch reactor equipped with a paddle stirrer was heated to 80° C. to 100° C. and purged with nitrogen, before a specific amount of catalyst was introduced, then isobutan was added and the stirring started. The temperature was adjusted to the desired temperature and ethylene fed to the reactor (with or without hydrogen) until a predetermined pressure was reached. Ethylene was then polymerised. The overall pressure was kept constant during the entire polymerisation run by feeding ethylene. The ethylene consumption was monitored during the polymerisation. When hexene-1 was used as a comonomer, this was fed to the reactor together with the isobutane. Optionally, also minor amounts of hydrogen were added continuously to the reactor blended into the ethylene feed. All reagents used was of "polymerisation grade".

Hexene-1, when used, was fed to the reactor by the use of a pump working in cascade with the ethylene feeding system. The reactor temperature was kept constant at a fixed temperature to an accuracy of +/−0,2° C. by automatically adjusting heating and/or cooling of the reactor. The polymerisation run was stopped when a desired polymer yield had been reached, or after a preset polymerisation time. The obtained polymer was weighed and samples collected for further treatment and measurements. One major sample was mixed with an additive-containing masterbatch to stabilise the polymer prior to further treatments.

Reactor conditions for the polymerisations are presented in Tables 3 to 7.

Polymer Characterisation Methods

The properties of the obtained polymers were determined by the use of the following characterisation methods:

Melt index, MFR, were determined according to the method of ASTM D 1238 at 190° C. and loads of 2.16 kg and 21.6 kg. The ratio between the melt index obtain with 21.6 kg and 2.16 kg loads is reported as FRR.

Rheology The relation between the molecular weight (Mw) determined by gel permeation chromatograpy (GPC) and zero viscosity ($\eta_0 o$) determined by dynamic measurements is expressed by the well known equation:

$$\eta_o = K \cdot (Mw)^\alpha$$

where K is a proportional constant and $\alpha > 1$. Because zero viscosity often is difficult to calculate $\eta(0.05)$ is used instead. Thus, a high $\eta(0.05)$ value means high molecular weight. Polymers with a broad molecular weight distribution (MWD) have a more pronounced shear thinning compared to polymers with a narrow MWD. Thus, a polymer with broad MWD will have a low $\eta(300)$ value even if it has a high $\eta(0.05)$ value.

Polydispersity Index, PI, given by the expression: $PI = 10^5/x$, wherein x is the value on the abscissa at the point of intersection between G' and G". A modulus of rigidity, G*, is defined by the expression: G*=G'+iG", where the real part, the storage modulus G', expresses the elasticity of the polymer while the imaginary part, the loss modulus G", expresses the viscous part of the polymer. A more elastic polymer then gives higher G values than a less elastic polymer. A plot of G'/freq versus G"/freq gives information about the elasticity of polymers. When the G' curve has a steeper slope, the point of intersection will take place at a smaller x value and PI will increase, i.e. more elastic polymers (i.e. polymers having a broader MWD) will give higher PI values.

Gel Permeation Chromatography, GPC, was used to separate is molecules according to their sizes and to calculate Mw, Mn and MWD. It was also used to estimate the fraction of polymer made from each type of catalytic site.

Infrared Analysis IR, in the range 1250 to 890 cm$^{-1}$ was used to detect end groups and the comonomer contents in the polymers. Polyethylenes produced with chromium catalysts will have unsaturation mainly as vinyl end groups, while metallocene catalysts produces mainly trans-vinylene end groups, and thus the fraction of polyethylenes produced from each catalyst can be quantified.

Examples 1 and 2

In an 8 l stainless steel reactor ethylene with 0.2% by weight of hexene was polymerised at 80° C. (example 1) and at 94° C. (example 2) in the presence of catalyst A specified above, according to the general polymerisation procedure described above. Experimental parameters and polymerisation results are presented in Table 3. They reveal that the polymerisation temperature had little influence on the activity of the catalyst.

Example 3

The polymerisation procedure of Example 1 was repeated, except that the chromium on the catalyst was in an oxidised state (not reduced). Experimental parameters and polymerisation results are presented in Table 3. The polymerisation activity was low.

Example 4 (Comparative)

The catalyst used was a chromium oxide catalyst not impregnated with metallocene and aluminoxan. The procedure of Example 2 was repeated. Experimental parameters and polymerisation results are presented in Table 3. The activity of the catalyst was low.

Example 5 (Comparative)

The polymerisation procedure of Example 1 was repeated, except that: the catalyst used was a conventional metallocene catalyst (SSC). Experimental parameters and polymerisation results are presented in Table 3. The activity of the catalyst was low.

Example 6 (Comparative)

The polymerisation procedure of Example 2 was repeated with a catalyst not containing metallocene. The catalyst had the same specifications as the catalyst of examples 1 and 2, except that the chromium oxide/silica catalyst had not been impregnated with metallocene, only with MAO. The activity of the catalyst was very low.

The catalyst of the present invention used in examples 1 and 2 had a significant higher activity than the common metallocene (single site) catalyst of comparative example 5, and the common chromium catalyst of comparative example 4. The catalyst of comparative example 6, which was not impregnated with metallocene, had a very low activity. The dual site catalysts of the present invention seem to contain an increased amount of active polymerisation sites in comparison with the other catalysts. The activity of the catalyst of the present invention is higher than the combined activities of the catalysts used in comparative examples 5 and 6. Consequently, the combined dual site catalyst of the present invention will have a synergistic effect.

The results from the characterisations of the obtained polyethylenes presented in Table 3 show that the polymers obtained with the catalyst of the present invention (examples 1 and 2) have properties laying between those of polyethylenes obtained with a normal chromium catalyst (comparative example 4) and a normal metallocene catalyst (comparative example 5). This supports the assumption that both the metallocene and chromium sites on the catalysts of the present invention are active during the polymerisation. Also the molecular weights confirm this. The polyethylenes obtained with the dual site catalyst have an increased Mw and MWD compared with the metallocene based catalysts (comparative example 5) and reduced Mw and MWD compared with the chromium based catalyst (comparative example 4).

IR analyses of films made from the obtained polymers detect the fraction of polymers polymerised from the metallocene sites on the catalysts. The results presented in Table 3 supports that both the metallocene and chromium sites are active during polymerisations. It is obvious that the dual site catalysts of the present invention produces two different polyethylenes simultaneously.

TABLE 3

| | Polymerisations | | | | | |
|---|---|---|---|---|---|---|
| Examples | 1 | 2 | 3 | Comp. 4 | Comp. 5 | Comp. 6 |
| Catalyst No. | A | A | A[2] | CrO$_x$[3] | SSC | Cr/MAO[4] |
| Cr/SiO$_2$ activation | | | | | | |
| Oxidation temp. (° C.): | 680 | 680 | 680 | 680 | 600(1) | 680 |
| Reduction temp. (° C.): | 380 | 380 | not red. | not red. | not red. | 380 |
| Polymerisation | | | | | | |
| Reactor temp. (° C.) | 80 | 94 | 80 | 94 | 80 | 94 |
| Total pressure (baro) | 26,0 | 30,5 | 26,0 | 30,5 | 26,0 | 30,5 |
| Cat. weight (g): | 0,649 | 0,653 | 0,888 | 0,412 | 0,798 | 0,892 |
| Induction time (min): | 0 | 0 | 1 | 5 | 0 | 1,5 |
| Run time (min): | 72 | 78 | 96 | 173 | 78 | 173 |
| Polymer yield (g): | 1820 | 1850 | 980 | 1265 | 1630 | 1010 |
| Productivity (g/g): | 2810 | 2830 | 1000 | 3070 | 2040 | 1130 |
| Activity (g/g · hr): | 2370 | 2280 | 680 | 1200 | 1540 | 400 |

TABLE 3-continued

| | Characterisation of polyethylenes | | | | | |
|---|---|---|---|---|---|---|
| Ex. No. | 1 | 2 | 3 | Comp. 4 | Comp. 5 | Comp. 6 |
| MFR2 | 0.43 | 0.60 | 0.12 | 0.03 | 0.96 | <0.01 |
| MFR21 | 10.2 | 15 | 5.5 | 2.8 | 16.5 | 1.4 |
| FRR | 17.2 | 25 | 46 | 90 | 17.2 | >140 |
| Density | 947 | 948 | 947 | 953 | 946 | 947 |
| G'(0,05) | 404 | 305 | 2140 | 5829 | 11 | 11320 |
| η(0,05) | 17563 | 13801 | 66701 | 182780 | 7696 | 323525 |
| η(300) | 1353 | 1168 | 1431 | 1323 | 1412 | 1533 |
| PI | 0.5 | 0.6 | 0.8 | 4.5 | 0.4 | 7.7 |
| Mw | 160,000 | 140,000 | 200,000 | nd | 135,000 | 560,000 |
| Mn | 45,000 | 44,000 | 41,000 | nd | 53,000 | 12,500 |
| MWD | 3.6 | 3.2 | 4.9 | nd | 2.5 | 42 |
| % SSC polymer | 82 | 90 | 70 | 0 | 100 | 0 |

(1) = Silica support calcination
(2) = Chromium oxide not reduced
(3) = $CrO_x$ only
(4) = No impregnation with metallocene
nd = not determined Examples 7 to 10

Polymerisations of ethylene in the presence of catalyst A were performed in a 2 l stainless steel reactor with 1 l isobutane as the reaction medium containing 0.16% or 2.92% by weight of hexene as comonomer. The ethylene feed contained 0, 1270 or 7000 ppm(mole) of hydrogen. The polymerisations were allowed to proceed for 60 min and were then terminated. The experimental parameters and polymerisation results are specified in Table 4.

Examples 11 and 12 (Comparative)

The polymerisation procedure of Examples 7 to 10 was followed. The catalyst used was a common metallocene catalyst. Experimental parameters and polymerisation results are presented in Table 4.

Table 5 shows that a polymerisation temperature of 94° C. compared with 85° C. gives polyethylenes with a higher Mw, a broader MWD and a distinct tail on the MWD curve. The reason is that chromium sites will have increasing activities as the temperature increases.

TABLE 4

| | Polymerisations | | | | | |
|---|---|---|---|---|---|---|
| Examples | 7 | 8 | 9 | 10 | Comp. 11 | Comp. 12 |
| Catalyst Ref. No. | A | A | A | A | SSC | SSC |
| Oxidation temp. (° C.): | 680 | 680 | 680 | 680 | 600 | 600 |
| Reduction temp. (° C.): | 380 | 380 | 380 | 380 | NA | NA |
| C6 in iC4 (wt %): | 0.16 | 2.92 | 2.92 | 2.92 | 0.16 | 2.92 |
| H2 in C2 (mol ppm): | 0 | 1270 | 7000 | 0 | 1270 | 7000 |
| Reactor temp. (° C.) | 94 | 85 | 94 | 94 | 94 | 94 |
| Total pressure (baro) | 30.5 | 22,0 | 25.0 | 25.0 | 30.5 | 25.0 |
| Cat. weight (g): | 0.094 | 0.130 | 0.142 | 0.104 | 0.093 | 0.099 |
| Productivity (g/g): | 1800 | 1540 | 1110 | 1590 | 3060 | 2830 |
| Activity to P4000 (g/g · hr): | 2000 | 1670 | 1270 | 1850 | 3220 | 3110 |

| | Characterisations of polyethylenes | | | | | |
|---|---|---|---|---|---|---|
| Examples | 7 | 8 | 9 | 10 | Comp. 11 | Comp. 12 |
| MFR2 (g/10 min): | 1.3 | 25 | >80 | 1.8 | 16.8 | >100 |
| MFR21 (g/10 min): | 24 | | | 35 | | |
| Density (g/dm³) | 946 | 930 | | 930 | 956 | 932 |
| FRR 21/2 | 18.5 | | | 19.4 | | |
| G'0,05 | 30 | 0.5 | 570 | 4 | | |
| η0,05 | 6080 | 330 | 25500 | 500 | | |
| η300 | 1250 | 210 | 1140 | 270 | | |
| PI | 0.41 | nd | 0.72 | nd | | |
| Mw | 135000 | 55000 | 30000 | 115000 | 60000 | 10000 |
| Mn | 38000 | 19000 | 4000 | 26000 | 15000 | 3000 |
| Mw/Mn | 3.6 | 2.9 | 7.5 | 4.4 | 4 | 3.3 |
| Cr/SSC | 5/95 | 10/90 | nd | 10/90 | | |

NA = not applicable
nd = not determined
MFR determined with powder

Examples 13 and 14

The catalyst B specified in Tables 1 and 2 calcined at 585° C. and then reduced at 380° C. before being impregnated with the metallocene catalyst and aluminoxan, as described above, was used in the polymerisations of ethylene in a 2 l stainless steel autoclave by following the general polymerisation procedure described above. The reaction medium was 1 l isobutane which contained hexene-1 as comonomer in amounts of 0.16 or 2.92% by weight, respectively, while the ethylene contained 270 ppm (moles) of $H_2$. The polymerisations were terminated after 60 minutes. Experimental parameters and polymerisation results are presented in Table 5.

Example 15 (Comparative)

The polymerisation procedure of Example 13 was followed, except that the catalyst used was a single site metallocene catalyst on a silica support. Experimental parameters and polymerisation results are presented in Table 5.

Catalyst B is a $Cr/SiO_2$ catalyst having a low pore volume, which is often used for the production of polyethylenes of high Mw. Examples 13 and 14 show that dual site catalysts also can be obtained with low pore catalyst precursors and give catalysts of acceptable activity. The melt index of the final polyethylene was controlled by the use of hydrogen, and the density by the use of hexene-1. Even if the obtained MWD is narrow, the MWD curve has a tail indicating a bimodal MWD. The influence of the chromium sites is less pronounced here than in the previously reported catalyst A.

TABLE 5

| Examples | 13 | 14 | 15 Comp. |
|---|---|---|---|
| Catalyst Ref. No. | B | B | sec |
| Oxidation temp. (° C.): | 585 | 585 | 600 |
| Reduction temp. (° C.): | 380 | 380 | — |
| C6 in iC4 (wt %): | 0,16 | 2,92 | 0,16 |
| H2 in C2 (mol ppm): | 1270 | 1270 | 1270 |
| Reactor temp. (° C.) | 85 | 94 | 94 |
| Total pressure (bar) | 27,5 | 25,0 | 30,5 |
| C2 pressure (bar) | 11,7 | 6,2 | 11,7 |
| Cat. weight (g): | 0,139 | 0,094 | 0,093 |
| Productivity (g/g): | 1550 | 1810 | 3060 |
| Activity to P4000 (g/g · hr): | 1530 | 2000 | 3220 |
| MFR2 (g/10 min): | 22 | 22,8 | 16,8 |
| NFR21 (g/10 min): | nd | nd | nd |
| Density (g/dm³) | 953 | 933 | 956 |

TABLE 5-continued

| Examples | 13 | 14 | 15 Comp. |
|---|---|---|---|
| Rheology: | | | |
| G'(0,05) | 2,9 | 4,1 | 4,0 |
| η(0,05) | 570 | 660 | 500 |
| η(300) | 240 | 250 | 270 |
| Two-Phase struc. | Yes | Yes | No |
| Mw | 70000 | — | 60000 |
| Mn | 15000 | — | 15000 |
| Mw/Mn | 4,7 | — | 4,0 |
| Cr/SSC | 10/90 | 10/90 | | nd = not determined

Examples 16 to 19

The catalyst C specified in Tables 1 and 2 calcined at 815° C. and then reduced at 380° C. (examples 16 to 18), and not reduced (example 19), before being impregnated with the single site metallocene catalyst and aluminoxan, as explained in detail above, was used in the polymerisation of ethylene at polymerisation conditions given in Table 6, where also the polymerisation results are presented.

Examples 20 and 21

The procedure of Examples 16 to 18 was repeated, except that catalyst C was activated at a lower temperature of 620° C. Experimental parameters and polymerisation results are presented in Table 6.

Example 22 (Comparative)

The procedure of Example 19 was repeated, except that the catalyst was a normal single site metallocene catalyst. Experimental parameters and polymerisation results are presented in Table 6.

All catalysts used in examples 16 to 21 gave polyethylenes having a high Mw, a broad MWD and two-phase structures. The GPC curves show tails at both low and high Mw. These catalysts C gave polyethylenes with higher molecular weights than the catalysts A. In comparison, by the use of a common metallocene catalyst based on catalyst precursor C (comparative example 22) it was obtained polyethylenes with a more narrow MWD and no tails on the MWD curve. The catalysts of examples 16 to 21 are all dual site catalysts having acceptable activities. These examples show that it is possible to obtain dual site catalysts also without subjecting the chromium to reduction.

TABLE 6

| Examples | 16 | 17 | 18 | 19 | 20 | 21 | Comp. 22 |
|---|---|---|---|---|---|---|---|
| Polymerisations | | | | | | | |
| Catalyst Ref. No. | C | C | C | C | C | C | SSC |
| Oxidation temp. (° C.): | 815 | 815 | 815 | 815 | 620 | 620 | 600 |
| Reduction temp. (° C.): | 380 | 380 | 380 | not red. | 380 | 380 | |
| C6 in iC4 (wt %): | 0.16 | 2.92 | 2.92 | 5.96 | 2.92 | 2.92 | 5.96 |
| H2 in C2 (mol ppm): | 0 | 0 | 1270 | 0 | 1270 | 0 | 0 |
| Reactor temp. (° C.) | 94 | 85 | 94 | 85 | 85 | 94 | 85 |
| Total pressure (baro) | 30.5 | 22.0 | 25.0 | 19.5 | 22.0 | 25.0 | 19.5 |
| Cat. weight (g): | 0.796 | 0.146 | 0.139 | 0.609 | 0.135 | 0.119 | 0.567 |
| Induction time (min): | 1 | 0 | 1 | 1 | 0 | 0 | 0 |
| Run time (min): | 56 | 60 | 60 | 56 | 60 | 60 | 42 |

TABLE 6-continued

| Examples | 16 | 17 | 18 | 19 | 20 | 21 | Comp. 22 |
|---|---|---|---|---|---|---|---|
| Polymer yield (g): | 1110 | 178 | 176 | 610 | 224 | 205 | 1420 |
| Productivity (g/g): | 1400 | 1220 | 1270 | 1000 | 1620 | 1720 | 2600 |
| Activity to P4000 (g/g · hr): | 1280 | 1300 | 1370 | 1100 | 1800 | 1780 | 3160 |
| Characterisation of polyethylenes | | | | | | | |
| MFR2 (g/10 min): | 0.77 | 1.3 | 16.4 | 1.10 | 21.4 | 1.50 | 1.10 |
| MFR21 (g/10 min): | 16 | 30 | nd | 22 | nd | 30 | 17.5 |
| FRR21/2 | 20.8 | 23 | | 20 | | 20 | 15.9 |
| Density: | 942 | 926 | 933 | 915 | 934 | 925 | 912 |
| G'0,05 | 290 | 31 | 8 | 139 | 5.5 | 14 | 16 |
| η0,05 | 16700 | 5580 | 790 | 11090 | 530 | 5260 | 6720 |
| η300 | 1200 | 1150 | 210 | 1030 | 200 | 1260 | 1390 |
| PI | | 0.59 | 0.44 | | 0.64 | | 0.42 |
| Two Phase Structure | Yes | Yes | Yes | Yes | Yes | | |
| Mw | 190000 | 145000 | 80000 | 168000 | 78000 | 120000 | 120000 |
| Mn | 20000 | 20000 | 10000 | 12000 | 16000 | 27000 | 40000 |
| Mw/Mn | 9.5 | 7.3 | 8.0 | 14 | 4.9 | 4.4 | 3 |
| Cr/SSC | 20/80 | 1/9 | 1/9 | 30/70 | 1/9 | 1/9 | | nd = not determined

Example 23

In a stainless steel reactor was filled 1.8 l isobutane and 20 ml 1-hexene. The reaction medium was heated to 90° C. and ethylene fed until a pressure of 5 bar. Catalyst A from Table 1, activated at conditions 680–380° C., was introduced and the polymerisation started immediately. After 60 minutes the polymerisation reaction was terminated and the produced polyethylene recovered. Experimental parameters and polymerisation results are presented in Table 7.

Example 24

The procedure of Example 23 was repeated, except that the catalyst used contained hafnium instead of zirconium. Thus, the metallocene impregnated onto the chromium oxide/silica catalyst was bis(n-butylcyclopentadienyl) hafnium dichloride. The catalyst had the same greenish colour as the catalyst used in Example 23. Experimental parameters and polymerisation results are presented in Table 7.

Example 25 (Comparative example)

The procedure of Example 23 was repeated, except that the catalyst used had not been impregnated with metallocene. Thus, the catalyst was a chromium oxide/silica catalyst. Experimental parameters and polymerisation results are presented in Table 7.

TABLE 7

| Examples | 23 | 24 | 25 Comp. |
|---|---|---|---|
| Catalyst Ref. No. | A, Zr | A, Hf | CrO$_x$ |
| Oxidation temp. (° C.): | 680 | 680 | 680 |
| Reduction temp. (° C.): | 380 | 380 | 380 |
| C6 in iC4 (wt %): | 1.1 | 1.1 | 1.1 |
| Cat. weight (g): | 0,110 | 0,202 | 0,144 |
| Activity (g/g · hr): | 1180 | 250 | 310 |
| MFR2 (g/10 min): | 3.6 | nd | 0.21 |
| MFR21 (g/10 min): | 60 | 0.78 | 7.9 |
| G'5 kPa (Pa) | 575 | 1410 | 3380 |
| η(300) (Pa · s) | 2465 | 400,000 | 218,000 |
| Mw | 92,300 | 381,500 | 203,500 |
| Mw/Mn | 2.5 | 3.4 | 12.0 | nd = not determined

Example 26 (Comparative)

A polymerisation was performed analogously to the polymerisation procedure of EP 339,571 (Showa Denko). Two separate catalysts were used: (a) a particulate Cr/SiO$_2$ catalyst, and (b) a catalytic solution prepared according to steps (1) through (3) of the procedure for "Impregnation with a metallocene compound and MAO" disclosed on page 11 of the this specification. The general polymerisation procedure described on page 12 above was followed, except that 1.5 bar of H$_2$ was fed to the reactor at 30° C., together with the Cr/SiO$_2$ catalyst, the catalytic solution and isobutane. The temperature inside the reacator was then increased to 80° C. before the ethylene feed was started. The polymerisation was continued for 44 minutes. A layer of low molecular polymers formed on the walls of the reactor and the stirrer. The produced polymer had a density of 956 g/dm$^3$, MFR2 of 1.5 and MFR21 of 38 g/10 min. The polyethylene had molecular weights Mw of 130,000, Mn of 1,900 and Mw/Mn of 70. The produced polyethylene had a GPC curve revealing two components each having narrow molecular weight distributions. None of these two components had the broadness of a chromium catalyst polymer.

What is claimed is:

1. A particulate, modified chromium oxide catalyst for the polymerisation of ethylene or ethylene with α-olefins, comprising:
    a) a chromium-oxide catalyst comprising a chromium oxide mainly in a bivalent oxidation state combined with an inorganic support wherein the catalyst contains 0.4% to 10% by weight of Cr; 0.1% to 0.6% by weight of Zr or Hf; and 5% to 20% by weight of Al; calculated as metals based on the total weight of the catalyst,
    b) a transition metal compound comprising at least one cyclopentadienylic ring bonded to said transition metal, which cyclopentadienylic ring may contain hetero atoms, be unsubstituted or substituted, bonded to the transition metal through a bridge, optionally annealed to other substituted or unsubstituted ring structures, and if two cyclopentadienyl rings are present they may be bonded to each other through a bridge, and
    c) an aluminoxane;
    said transition metal compound and said aluminoxane being impregnated in said chromium oxide catalyst.

2. A catalyst according to claim 1, wherein said inorganic support contains above 85% by weight of silica.

3. A catalyst according to claim 1, wherein the transition metal is selected from the group consisting of titanium, zirconium and hafnium.

4. A catalyst according to claim 1, wherein the aluminoxane is methylaluminoxane.

5. A catalyst according to claim 1, wherein the catalyst contains 0.4 to 1% by weight of Cr, about 0.2% by weight of Zr, and about 5% by weight of Al.

6. A catalyst according to claim 1, wherein said catalyst has the shape of spherical or spheroidal particles.

7. A polyethylene produced by the homopolymerisation of ethylene or copolymerisation of ethylene with an α-olefin in the presence of a catalyst according to claim 1 under conditions of continuous feeding of reactants and removal of polymerisate.

8. A catalyst according to claim 2, wherein the transition metal is selected from the group consisting of titanium, zirconium and hafnium.

9. A method for the preparation of a catalyst for the polymerisation of ethylene, or ethylene with α-olefins, said method comprising the steps of:
   a) subjecting a chromium oxide catalyst precursor, which comprises a chromium oxide compound combined with an inorganic support, to a temperature in the range of from 400 to 950° C. under oxidising conditions,
   b) subjecting the oxidised catalyst precursor obtained in step a) to reducing conditions to obtain a major part of the chromium in a divalent oxidation state wherein the catalyst contains 0.4% to 10% by weight of Cr; 0.1% to 0.6% by weight of Zr or Hf; and 5% to 20% by weight of Al; calculated as metals based on the total weight of the catalyst, and thereafter
   c) impregnating the obtained chromium catalyst separately or simultaneously with a catalyst activator and with a transition metal compound which comprises at least one cyclopentadienylic ring bonded to said transition metal and at least one ligand selected from the group comprising alkoxy, amido and hydrocarbyl radicals, halogen and hydride bonded to said transition metal, which cyclopentadienylic ring may contain hetero atoms, be unsubstituted or substituted, be bonded to said transition metal through a bridge, and optionally annealed to other substituted or unsubstituted ring structures, and if two cyclopentadienyl rings are present they may be bonded to each other through a bridge, and
   d) subjecting the thus obtained particulate catalyst to drying conditions.

* * * * *